United States Patent
Karakas

(10) Patent No.: US 8,731,694 B2
(45) Date of Patent: May 20, 2014

(54) PORTABLE DEVICE WITH FREEFALL DETECTION OR AUDIO PROCESSING SUBSYSTEM AND FREEFALL DETECTION OR AUDIO PROCESSING METHOD

(75) Inventor: Ahmet Karakas, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 339 days.

(21) Appl. No.: 12/796,624

(22) Filed: Jun. 8, 2010

(65) Prior Publication Data

US 2010/0238587 A1    Sep. 23, 2010

Related U.S. Application Data

(62) Division of application No. 11/387,287, filed on Mar. 22, 2006, now Pat. No. 7,751,142.

(51) Int. Cl.
*G06F 17/00* (2006.01)

(52) U.S. Cl.
USPC ................................. 700/94; 482/3

(58) Field of Classification Search
USPC ................................. 700/94; 482/3
See application file for complete search history.

(56) References Cited

U.S. PATENT DOCUMENTS

| | | | |
|---|---|---|---|
| 4,862,298 | A | 8/1989 | Genheimer et al. |
| 5,235,472 | A | 8/1993 | Smith |
| 5,521,772 | A | 5/1996 | Lee et al. |
| RE35,269 | E | 6/1996 | Comerford |
| 5,835,298 | A | 11/1998 | Edgerton et al. |
| 6,046,877 | A | 4/2000 | Kelsic |
| 6,101,062 | A | 8/2000 | Jen et al. |
| 6,520,013 | B1 | 2/2003 | Wehrenberg |
| 6,768,066 | B2 | 7/2004 | Wehrenberg |
| 6,940,407 | B2 | 9/2005 | Miranda-Knapp et al. |
| 7,059,182 | B1 | 6/2006 | Ragner |
| 7,161,758 | B2 | 1/2007 | Adapathya et al. |
| 7,190,540 | B2 | 3/2007 | Matsumoto |

(Continued)

OTHER PUBLICATIONS

Vivid Light Photography, "Vivid Light Photography News", 2 pages, downloaded from the internet on Jan. 12, 2006 from http://www.vividlight.com/articles/4006.htm.

(Continued)

*Primary Examiner* — Joseph Saunders, Jr.

(57) ABSTRACT

In a class of embodiments, a method and apparatus for detecting freefall of a disk device (thereby predicting that the disk device will likely suffer imminent physical impact) and typically also preventing damage that a disk drive of the device would otherwise suffer if and when a predicted impact occurs. In some embodiments, a disk device includes a freefall detection processor and a CPU. The freefall detection processor is configured to monitor acceleration data to determine whether the disk device is in freefall and to perform at least one other operation (e.g., decoding of MP3-encoded audio data to generate decoded audio data) while the CPU performs at least one other task. Other embodiments pertain to a portable device including a digital audio processing subsystem and an accelerometer. The digital audio processing subsystem is configured to monitor acceleration data to identify any rhythm associated with motion of the portable device and to modify the playback of audio data in response to any such identified rhythm.

19 Claims, 2 Drawing Sheets

(56) References Cited

U.S. PATENT DOCUMENTS

| | | |
|---|---|---|
| 7,191,089 B2 | 3/2007 | Clifford et al. |
| 7,369,345 B1 | 5/2008 | Li et al. |
| 2005/0177080 A1* | 8/2005 | Yasuhara et al. ............... 602/16 |
| 2005/0213242 A1 | 9/2005 | Fujiki et al. |
| 2006/0100887 A1 | 5/2006 | Erickson et al. |
| 2006/0107822 A1* | 5/2006 | Bowen ............................ 84/612 |
| 2006/0215299 A1 | 9/2006 | Kao et al. |
| 2007/0113286 A1 | 5/2007 | Cromer et al. |

OTHER PUBLICATIONS

Nanotechwire.com, "Analog Devices' 3-Axis MEMS Accelerometer Available Now", dated Nov. 1, 2005, pp. 1-3, downloaded from the internet on Jan. 12, 2006 from http://nanotechwire.com/news.asp?nid=2513&tid=126&pg=2.

Bosch Sensortec, "Portable Music Players", one page, downloaded from the Internet on Jan. 12, 2006 from http;//www.bosch-sensortec.com/content/language/html/3020.htm.

* cited by examiner

PORTABLE DEVICE WITH FREEFALL DETECTION OR AUDIO PROCESSING SUBSYSTEM AND FREEFALL DETECTION OR AUDIO PROCESSING METHOD

RELATED APPLICATIONS

This application is a divisional of U.S. patent application Ser. No. 11/387,287, filed Mar. 22, 2006, naming Ahmet Karakas as the inventor. This application is incorporated herein by reference in its entirety and for all purposes.

FIELD OF THE INVENTION

The invention pertains to portable devices (e.g., notebook computers and media players) that include at least one accelerometer and typically also at least one disk drive. In typical embodiments, the invention pertains to a portable device including at least one disk drive and an impact detection subsystem configured to detect freefall of the device (thereby predicting a physical impact to which the device will likely be subjected). Preferably also, the device is configured to protect the disk drive from damage resulting from a predicted impact.

BACKGROUND OF THE INVENTION

The expression "disk device" herein denotes a portable device including at least one disk drive. Examples of disk devices are media players, notebook computers, tablet PCs, PDAs (personal digital assistants), smart cellular phones (e.g., phones capable of playing and displaying multimedia content), and portable computing systems, each including at least one disk drive.

Disk drives of disk devices are prone to damage and data skipping when subjected to physical impacts. A typical impact scenario is an accidental drop of a disk device. An impact can corrupt data that are being or have been read from a disk drive (or data that are being or have been written to the drive) and/or can damage the disk drive itself. It would be desirable to predict physical impact to which a disk device will likely be subjected, so that each data reading head (of each disk drive of the device) can be quickly placed into a "parked" position, or so that other action can quickly be taken to protect each disk drive from physical damage if and when the impact occurs.

It has been proposed to include an accelerometer in a portable computer or other portable device (e.g., a portable media player, PDA, or MP3 digital audio player) for use in protecting the portable device (e.g., to protect a disk drive thereof by performing a disk drive head parking operation), for example, to take protective action when acceleration data from the accelerometer indicate that the device will suffer imminent impact or that the device's acceleration is within a predetermined range (e.g., a predetermined range including gravitational acceleration, $g=9.8$ m/sec$^2$). For example, U.S. Reissue Pat. No. 35,269, to Comerford, describes a dedicated processor (installed in a portable computer) that monitors the output of an accelerometer (also installed in the computer). When the sensed acceleration is within a predetermined range near gravitational acceleration, the dedicated processor issues an interrupt to the computer's CPU to trigger a head parking operation, or itself triggers parking of the disk drive heads and optionally also braking of the motion of each disk.

Similarly, U.S. Pat. No. 6,520,013 and U.S. Pat. No. 6,768,066, to Wehrenberg, describe parking a read/write head of a data storage device (in a processing system) in response to sensing that the processing system's acceleration has reached a threshold value.

Also similarly, U.S. Pat. No. 5,835,298, issued to Edgerton, et al., describes a dedicated processor (installed in a portable computing device) that monitors the output of an accelerometer (also installed in the computing device), processes the accelerometer data (e.g., by performing numerical integration thereon) to generate data indicative of translational velocity (or the square, or other function, of the translational velocity) of the computing device, and, when the translational velocity (or the square thereof) exceeds a predetermined threshold, takes steps to protect a disk drive of the device (e.g., by initiating an operation to park the disk drive heads).

U.S. Pat. No. 6,101,062, to Jen, et al., discloses a feedback loop in which a processor (servo processor 102) controls motor speed of a disk drive in response to measured motor spin current data (indicative of motor speed of the disk drive), processes the measured data to infer whether the disk drive is undergoing hazardous acceleration, and initiates protective action (e.g., triggers parking of disk drive heads, or powers down the disk drive) in response to inferring that hazardous acceleration is occurring. However, the data processing (to infer that hazardous acceleration is occurring) requires complicated exponential averaging of the data (by generating a long decay exponential average and a short decay exponential average of the data and comparing the two averages), or the complicated steps of obtaining and storing a library of motion signatures (indicative of hazardous acceleration), comparing the measured data to the stored motion signatures, and inferring that hazardous acceleration is occurring when the measured data match a stored motion signature.

It has also been proposed to include an accelerometer in a digital camera, and use acceleration data from the accelerometer to prevent picture blurring in image data generated by the camera, or to switch between operating modes (e.g., landscape and portrait modes) when taking still pictures or shooting video.

SUMMARY OF THE INVENTION

In a class of embodiments, the invention is a method and apparatus for inferring freefall of a disk device from acceleration data (thereby predicting that the disk device will likely suffer an imminent physical impact) and typically also preventing physical damage that a disk drive of the device would otherwise suffer if and when a predicted impact occurs.

The expression "acceleration data" herein denotes data indicative of sensed acceleration. Examples of acceleration data include the output of an accelerometer, and a processed version of the output of an accelerometer (e.g., a digitized version of the analog output of an analog accelerometer). The term "accelerometer" is used herein in a broad sense to denote either an analog accelerometer (which outputs analog acceleration data), a digital accelerometer (which outputs digital acceleration data), or the combination of an analog accelerometer and a digital-to-analog converter coupled and configured to generate digital acceleration data in response to analog acceleration data output from the analog accelerometer.

In typical embodiments, the invention is a disk device including a freefall detection subsystem configured to detect freefall of the disk device. The freefall detection subsystem includes an accelerometer and a processor (to be referred to as a "freefall detection processor") coupled and configured to monitor acceleration data (either the output of the accelerometer or a processed version the accelerometer's output) to determine whether the disk device is in freefall. Since detection of freefall in accordance with the invention is a prediction that a disk device of the device will likely be subject to imminent physical impact, the freefall detection subsystem will sometimes be referred to herein as an impact detection (or impact prediction) subsystem. Preferably the disk device is also configured to protect each disk drive thereof from damage that it would otherwise suffer if and when a predicted impact occurs. In some of the embodiments described in this paragraph, the inventive disk device includes at least two processors: a CPU and an auxiliary processor. The auxiliary processor is the freefall detection processor, and is configured to perform both freefall detection in accordance with the invention and at least one other operation (e.g., decoding of MP3-encoded audio data to generate decoded audio data, or another conventional operation) while the CPU performs at least one other task. The auxiliary processor is shared in the sense that it is configured to perform freefall detection in accordance with the invention, and is also configured to perform the conventional processing. Embodiments of the inventive disk device that include a shared freefall detection processor can make efficient use of processing hardware already present in conventional disk devices to implement freefall detection in accordance with the invention, and can be manufactured by modifying a conventional disk device (by installing an accelerometer therein) without also modifying the conventional disk device to include therein an additional processor (e.g., a second auxiliary processor) dedicated to performing freefall detection.

In some embodiments, the inventive device is a portable device including a digital audio processing subsystem (configured to decode and/or otherwise process digital audio data for playback) and an accelerometer. The digital audio processing subsystem is configured to monitor acceleration data (indicative of the instantaneous acceleration of the portable device as sensed by the accelerometer) to identify any rhythm associated with motion of the portable device (for example, the period and phase of any periodic motion of the portable device, e.g., periodic motion that may occur while a user wearing the device jogs or otherwise moves rhythmically) and to modify the playback of audio data in response to any such identified rhythm (e.g., to speed up or slow down playback of the audio data to match the rhythm of periodic motion of the device). Examples of such a portable device include notebook computers, tablet PCs, PDAs (personal digital assistants), smart cellular phones, and personal media players (e.g., personal media players configured to decode MP3 audio data for playback). Other embodiments are digital audio processing methods performed by any such portable device.

In a class of embodiments, the invention is a method for determining that a disk device is in freefall, including the steps of:

(a) determining from acceleration data indicative of instantaneous acceleration of the disk device whether said instantaneous acceleration is less than gravitational acceleration during a first time interval of predetermined duration;

(b) determining from the acceleration data whether said instantaneous acceleration has a time derivative whose absolute magnitude exceeds a predetermined minimum value (e.g., a predetermined minimum value at least substantially equal to zero) during a second time interval having a second predetermined duration; and (c) determining that the disk device is in freefall by determining that said instantaneous acceleration is not less than gravitational acceleration during the first time interval and the absolute magnitude of the time derivative of said instantaneous acceleration does not exceed the predetermined minimum value during the second time interval.

Typically, the acceleration data comprise samples generated during sample periods, the first time interval is a predetermined number of the most recent consecutive sample periods, the second time interval is a second predetermined number of the most recent consecutive sample periods, and the second time interval coincides with the first time interval (or one of the second time interval and the first time interval is a subinterval of the other and the two intervals do not coincide with each other). Typically, step (b) includes the steps of generating derivative data indicative of the absolute magnitude of the time derivative of the instantaneous acceleration, and determining from the derivative data whether the absolute magnitude of the time derivative of the instantaneous acceleration exceeds the predetermined minimum value during the second time interval.

Preferably, the method also includes the step of triggering a disk drive protection operation in response to determining that the disk device is in freefall, and triggering of the disk drive protection operation occurs with sufficient lead time to allow completion of the operation during freefall of the disk device over a distance as small as about 10 cm.

Determination in step (c) that the absolute magnitude of the time derivative of the disk device's instantaneous acceleration does not exceed the predetermined minimum value during the second time interval prevents determination that the disk device is in freefall in cases in which the disk device undergoes time-varying acceleration (in contrast with freefall). The first time interval should have sufficient duration to prevent determination in step (c) that the disk device is in freefall in cases in which the disk device undergoes large acceleration (having magnitude equal to or greater than gravitational acceleration) but for such a brief time that the acceleration is unlikely to cause damage to the disk device. Each of the first time interval and the second time interval is preferably sufficiently short to allow triggering of a disk drive protection operation with sufficient lead time to allow completion of the operation (to protect each disk drive of the device from damage that it would otherwise suffer from impact) before the device suffers impact from a fall from a typical height. Preferably, the acceleration data undergo low pass filtering before step (a) is performed and before they are processed to generate the derivative data of step (b).

Other aspects of the invention are a processor (e.g., a processor implemented as an integrated circuit) programmed to implement any embodiment of the inventive method (in response to acceleration data) or a freefall detection subsystem configured to be installed in a disk device to implement any embodiment of the inventive method.

DETAILED DESCRIPTION OF PREFERRED EMBODIMENTS

Figure 1:
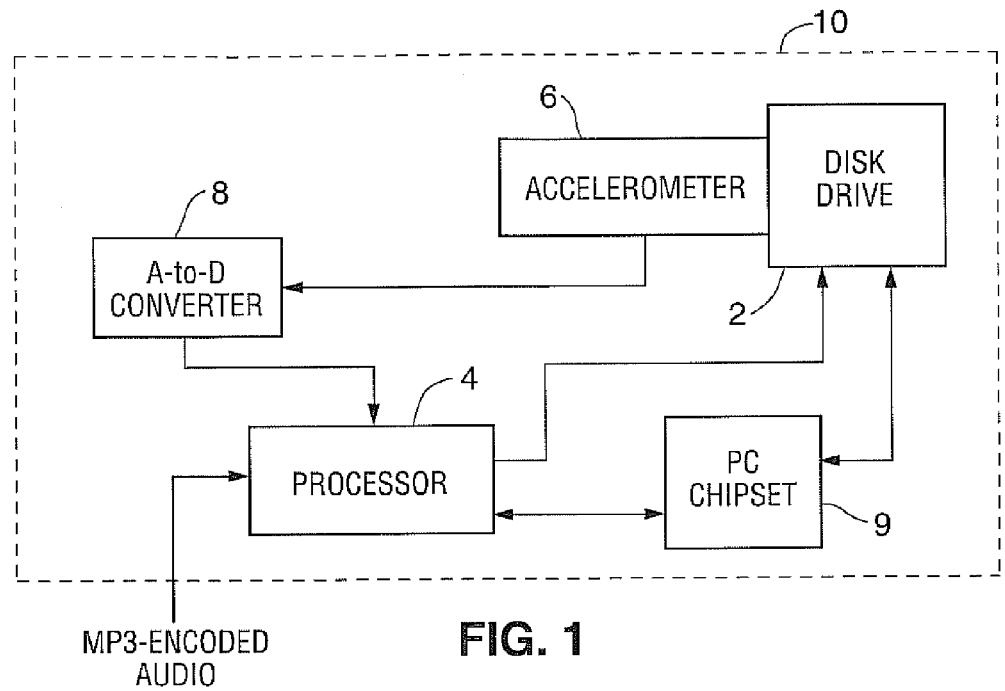
FIG. 1 is a block diagram of elements of an embodiment of the inventive disk device.

With reference to FIG. 1, disk device 10 is an embodiment of the inventive disk device. Disk device 10 includes disk drive 2, processor 4, accelerometer 6, analog to digital conversion circuit 8, and PC chipset 9, connected as shown in FIG. 1. Typically, disk device 10 includes other elements but these are not shown for simplicity. PC chipset 9 is a conventional chipset that implements a CPU that runs operating system software for disk device 10 when the device 10 has been booted up into a normal operating mode.

Accelerometer 6 is mounted so as to be capable of sensing the instantaneous acceleration of disk drive 2. Typically, disk drive 2 is mounted fixedly within device 10 so that the acceleration of disk drive 2 is the same as the acceleration of the entire device 10. The description herein assumes that the accelerometer of each embodiment of the inventive disk device senses acceleration of at least one disk drive of the disk device although (for simplicity) the accelerometer may be described as being capable of sensing acceleration of the disk device.

Analog-to-digital converter 8 captures the acceleration data output (in analog form) from accelerometer 6 and converts this data into the digital domain for processing by processor 4. If accelerometer 6 is configured to output digital data indicative of sensed acceleration (rather than analog data), A-to-D converter 8 can be omitted and the output of accelerometer 6 provided directly to processor 4. Processor 4 saves the sensor data from converter 8 (or accelerometer 6, if converter 8 is omitted) into a file and processes the saved data to generate an indication as to whether disk device 10 is in freefall, or it processes the sensor data (to generate an indication as to whether disk device 10 is in freefall) without first saving the data.

Processor 4 is an auxiliary processor configured to perform at least one type of conventional processing (e.g., decoding of MP3-encoded audio data to generate decoded audio data) while the CPU of device 10 (implemented in chipset 9) performs at least one other task. Processor 4 is shared in the sense that it is configured (e.g., programmed) to process acceleration data from converter 8 (or accelerometer 6, if converter 8 is omitted) in accordance with the invention, in addition to performing such conventional processing. Thus, disk device 10 make efficient use of processing hardware that is present therein for performing conventional operations, to implement acceleration data processing in accordance with the invention, rather than employing an additional processor (e.g., an additional dedicated processor) to perform the acceleration data processing. In alternative embodiments of the invention, a dedicated processor may be employed for performing acceleration data processing in accordance with the invention.

Figure 3:
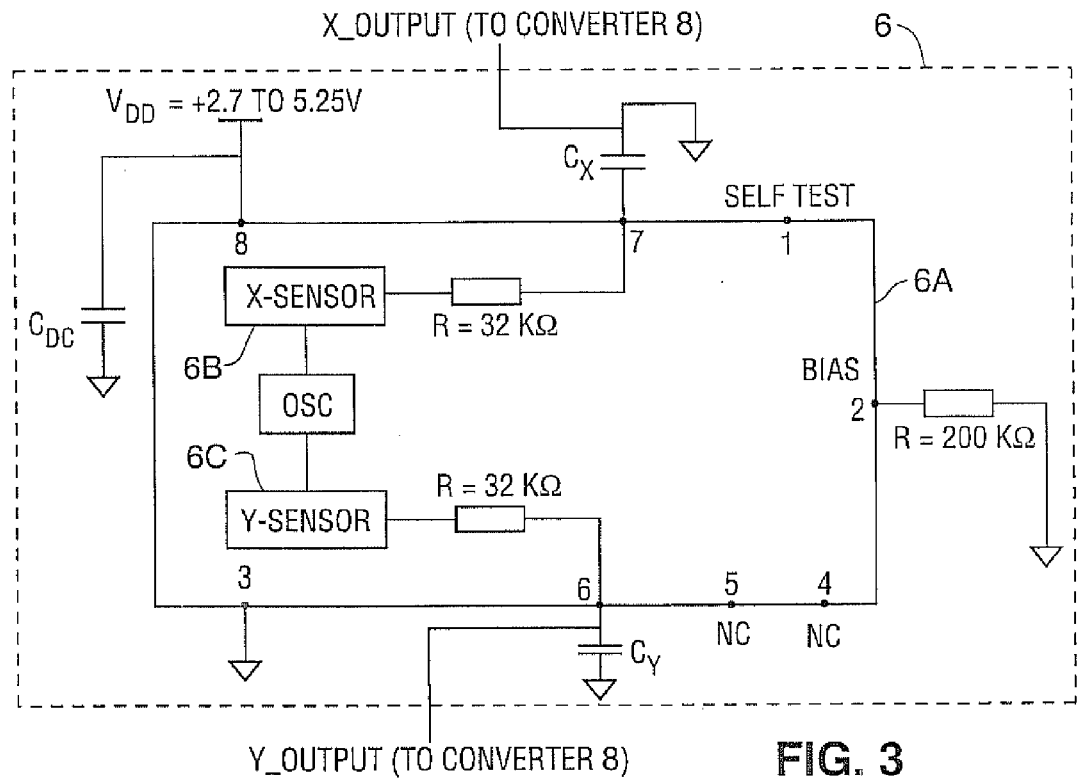
FIG. 3 is a circuit diagram of elements of an embodiment of accelerometer 6, including two-sensor accelerometer 6A and biasing and low-pass filtering circuitry.

The following description assumes a typical implementation of accelerometer 6 in which accelerometer 6 is or includes a two-sensor device (e.g., an accelerometer Model No. ADXL311, available from Analog Devices, Inc., with biasing and low-pass filtering circuitry, as shown in FIG. 3) whose sensors are configured to detect acceleration in each of two orthogonal directions. Such sensors are sometimes referred to as an "x-axis" sensor and a "y-axis" sensor.

Figure 2:
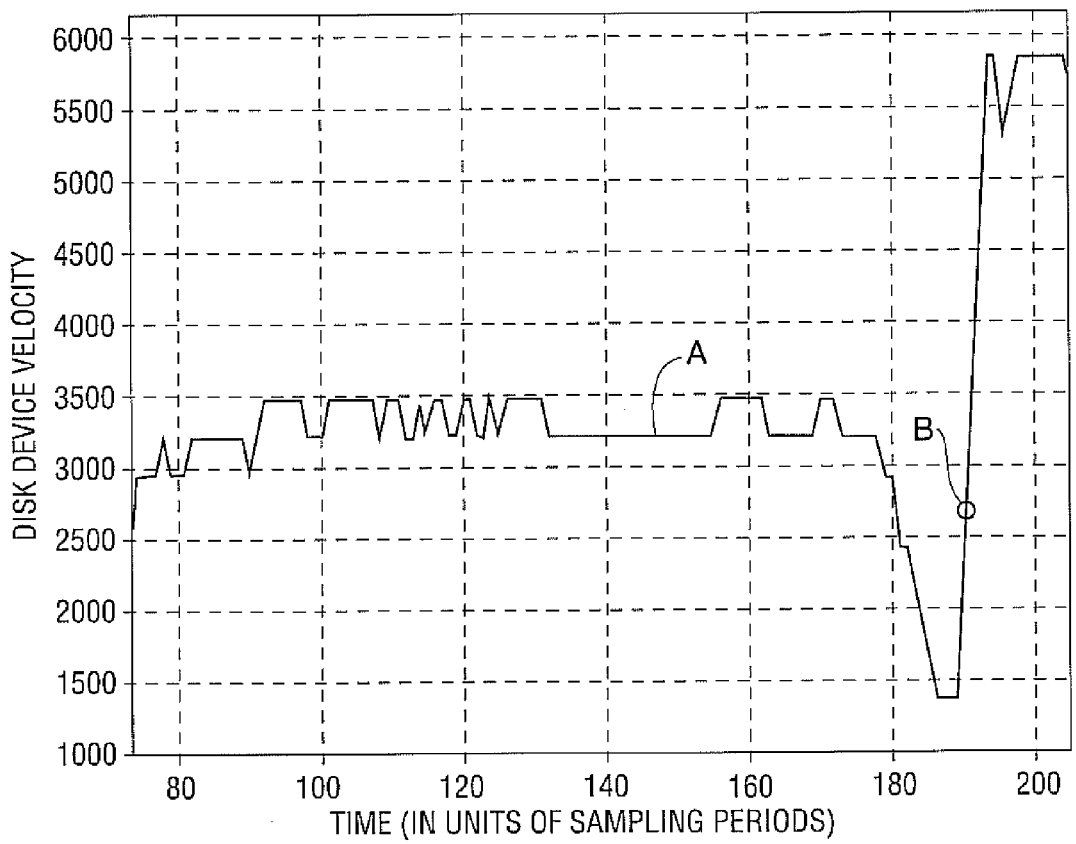
FIG. 2 is a plot of velocity data (indicative of the velocity of the disk device of FIG. 1) versus time (in units of sampling periods). The velocity data are derived from acceleration data output from an acceleration sensor (an "x-axis" sensor) of accelerometer 6.

FIG. 2 is a plot of velocity data indicative of the velocity of disk device 10 of FIG. 1, versus time. The velocity data are derived from the acceleration data output from analog-to-digital converter 8 in response to the output of one sensor (the "x-axis" sensor) of accelerometer 6. In FIG. 2, velocity is indicated in arbitrary units proportional (with an offset) to sensed velocity in the "x" direction, and is plotted as a function of time (in units of sampling periods). Since the sampling rate is 200 Hz, each sampling period has a duration of 5 milliseconds.

Preferably, processor 4 is programmed to process acceleration data indicative of instantaneous acceleration of disk device 10 (e.g., acceleration data generated by A-to-D converter 8 by sampling the output of each sensor of accelerometer 6) by:

(a) determining from the acceleration data whether the disk device's instantaneous acceleration is at least equal to (i.e., is not less than) gravitational acceleration ($g=9.8$ m/sec$^2$) during a first time interval having a predetermined duration (e.g., during a predetermined number of the most recent consecutive sample periods);

(b) generating data (to be referred to as "derivative data") indicative of the time derivative of the acceleration data (i.e., indicative of the instantaneous slope of the acceleration data plotted versus time) and determining from the derivative data whether the absolute magnitude of the time derivative of the disk device's instantaneous acceleration exceeds a predetermined minimum value (e.g., whether the time derivative of the instantaneous acceleration is substantially equal to zero) during a second time interval having a second predetermined duration (e.g., during a second predetermined number of the most recent consecutive sample periods), where the second time interval coincides with the first time interval (this is the case in typical embodiments) or one of the second time interval and the first time interval is a subinterval of (but does not coincide with) the other; and (c) determining that the disk device is in freefall by determining that both the following conditions exist: the disk device's instantaneous acceleration is not less than gravitational acceleration during the first time interval and the absolute magnitude of the time derivative of the disk device's instantaneous acceleration does not exceed the predetermined minimum value during the second time interval.

Determination in step (c) that the absolute magnitude of the time derivative of the disk device's instantaneous acceleration does not exceed the predetermined minimum value during the second time interval prevents determination that the disk device is in freefall in cases in which the disk device undergoes time-varying acceleration (in contrast with freefall). For example, determination in step (c) that the absolute magnitude of the time derivative of the disk device's instantaneous acceleration does not exceed the predetermined minimum value during the second time interval prevents determination that the disk device is in freefall in typical cases in which a user subjects the disk device to time-varying acceleration while holding the disk device.

The first time interval should have sufficient duration to prevent determination in step (c) that the disk device is in freefall in cases in which the disk device undergoes large acceleration (having magnitude equal to or greater than gravitational acceleration) but for such a brief time that the acceleration is unlikely to cause damage to the disk device, and should be sufficiently short to allow the processor to trigger a disk drive protection operation with sufficient lead time to allow completion of the operation (to protect each disk drive of the device from damage that it would otherwise suffer from impact) before the device suffers impact from a fall from a typical height.

Typically, processor 4 repeatedly performs steps (a), (b), and (c) until it determines during one performance of step (c) that the disk device is in freefall, and during each repetition it updates the first and second time intervals (e.g., the first time interval is always the X most recent consecutive sample periods, and the second time interval is always the Y most recent consecutive sample periods, where X and Y are numbers and X is typically equal to Y). Typically also, processor 4 generates a disk drive protection signal (which can be a control bit) upon determining that the disk device is in freefall. Preferably, the disk device is configured to perform a disk drive protection operation in response to the disk drive protection signal, to reduce or avoid damage to each disk drive of the disk device that would otherwise result from impact following freefall. Typically, the disk drive protection operation places each head (for reading and/or writing data) of each disk drive into a "parked" position in which the head cannot impact the surface of any data storage medium. For example, in an implementation of disk device 10 of FIG. 1, disk drive 2 is configured to perform such a head parking operation in response to a disk drive protection signal generated by processor 4 and asserted to disk drive 2.

It should be understood that processor 4 preferably combines data indicative of the outputs of separate "x-axis" and "y-axis" sensors of a two-sensor implementation of accelerometer 6 (in a manner that will be apparent to those of ordinary skill in the art) to generate data indicative of acceleration in an x-y plane determined by the sensors, and then processes this data (preferably in the above-described manner) to determine whether the disk device is in freefall. In other implementations, processor 4 combines data indicative of the outputs of "x-axis," "y-axis," and "z-axis" sensors of a three-sensor implementation of accelerometer 6 configured to detect acceleration in each of three orthogonal directions (in a manner that will be apparent to those of ordinary skill in the art) to generate data indicative of acceleration in three-dimensional space, and then processes this data (preferably in the above-described manner) to determine whether the disk device is in freefall.

We next consider an example of the inventive method in which:

processor 4 is programmed to process the FIG. 2 data to determine (in the manner described above) whether disk device 10 is in freefall;

the sampling rate is 200 Hz (so that in FIG. 2, time is indicated in units of sampling periods of 5 millisecond duration); and in FIG. 2, velocity of the disk device is indicated in arbitrary units that are proportional (with an offset of about 3200) to sensed velocity (so that in FIG. 2, disk device 10 has zero velocity at time "A").

In this example, a goal of the inventive method is to prevent damage to disk drive 2 of disk device 10 that would otherwise result from impact at a hard surface after a freefall of about 3 feet (≈1 meter) from an initial resting place (e.g., from a desk of typical height to the floor below the desk). When an object falls to the ground from a resting place 1 meter above the ground, it reaches the ground in $t_r=[2x/g]^{1/2}$=0.4515 seconds, where x=1 meter and "g" is gravitational acceleration. At the sampling rate of 200 Hz, $t_r$ is approximately equal to 90 sampling periods.

Assuming that disk drive 2 is a typical hard disk drive which requires about 100 ms (20 sampling periods) to park its head(s), the duration of the "first time interval" (in step (a) of the method) is preferably 20 ms (four sampling periods) in the example. For efficient processing, the "second predetermined duration" of the "second time interval" in step (b) of the method is also set to be 20 ms, and the second time interval is set to coincide with the first time interval. With these parameter choices, freefall detection requires four sampling periods and the inventive method can protect disk drive 2 from damage as a result of freefall over a distance as small as about 10 cm.

In the example, processor 4 determines that disk device 10 is in freefall at time "B" (indicated in FIG. 2) since it determines that the disk device's instantaneous acceleration has been equal to or greater than gravitational acceleration during the 20 ms period before time "B" and that the absolute magnitude of the time derivative of the disk device's instantaneous acceleration has not exceeded a small predetermined minimum value (i.e., that the slope of the graphed data of FIG. 2 has not changed significantly) during the 20 ms period before time "B."

FIG. 3 is a circuit diagram of elements of an embodiment of accelerometer 6, including two-sensor accelerometer 6A and biasing and low-pass filtering circuitry connected as shown. Accelerometer 6A is a two-sensor device (an accelerometer Model No. ADXL311, available from Analog Devices, Inc.) whose acceleration sensors 6B and 6C are configured to detect acceleration in each of two orthogonal directions. Sensor 6B is referred to herein as an "x-axis" sensor and sensor 6C is referred to herein as a "y-axis" sensor.

As shown in FIG. 3, sensor 6B is connected to ground via a 32K Ohm resistor and capacitor $C_x$, and sensor 6C is connected to ground via another 32K Ohm resistor and capacitor $C_y$. Biasing is provided by connecting accelerometer 6A between a first node maintained at potential Vdd (in the range 2.7V to 5.25V above ground) and coupled to ground via capacitor $C_{DC}$, and a second node coupled to ground via a 200K Ohm resistor as shown in FIG. 3.

In a preferred implementation of FIG. 3 (for use in performing the above-described method with the "first time interval" in step (a) and the "second time interval" in step (b) each having 20 ms duration), the capacitance of each of capacitors $C_x$, $C_y$, and $C_{DC}$ is 100 nF. The RC circuit comprising capacitor $C_x$ and the 32K Ohm resistor connected in series therewith acts as a low-pass filter (for x-axis sensor 6B) whose cut off frequency is $f=1/[2\Pi(32\times10^3)(100\times10^{-6})]\approx50$ Hz. The RC circuit comprising capacitor $C_y$ and the 32K Ohm resistor connected in series therewith acts as a low-pass filter (having the same cut off frequency) for y-axis sensor 6C. In view of this cut-off frequency for each low-pass filter, the sampling rate of 200 Hz is appropriate.

In general, acceleration data to be processed in accordance with the invention preferably undergo low-pass filtering before such processing (e.g., the acceleration data preferably undergo low-pass filtering before performance of step (a) of the above-described three-step embodiments of the inventive method and before they are processed to generate the derivative data of step (b) of such embodiments of the inventive method). The sampling rate (the rate at which samples of the acceleration data are generated) should be at least twice the cut-off frequency for the low-pass filtering.

In alternative embodiments, the invention is a method and apparatus for detecting excessive acceleration or deceleration (i.e., acceleration or deceleration outside the range that each disk drive of the device is designed to tolerate without damage). In preferred embodiments in this class, each disk drive of a disk device is designed to tolerate acceleration having absolute magnitude that does not exceed a maximum acceleration, and the method includes (or the apparatus is configured to perform) the step of determining from acceleration data indicative of instantaneous acceleration of the disk device whether said instantaneous acceleration has an absolute value that has increased from below a predetermined threshold value to a value greater than the predetermined threshold value, where said predetermined threshold value is less than the maximum acceleration, thereby determining that the disk device is undergoing intolerable acceleration. The predetermined threshold value is preferably chosen so that determination of intolerable acceleration occurs only when it is likely that the absolute value of the disk device's instantaneous acceleration will soon reach the maximum acceleration, and so that each such determination is made with sufficient lead time to allow completion of a disk drive protection operation (to protect each disk drive of the device from damage that it would otherwise suffer from reaching the maximum acceleration) and/or a disk caching operation before the absolute value of the device's instantaneous acceleration is likely to reach the maximum acceleration. Disk device 10 of FIG. 1 can be implemented (including by programming processor 4 appropriately) to perform the embodiments described in this paragraph if disk drive 2 is designed to tolerate acceleration having absolute magnitude that does not exceed a maximum acceleration.

In some embodiments (including the embodiment to be described with reference to FIG. 4), the inventive device is a portable device including a digital audio processing subsystem (configured to decode and/or otherwise process digital audio data for playback) and an accelerometer. The digital audio processing subsystem is configured to monitor acceleration data (either the output of the accelerometer or a processed version the accelerometer's output) to identify any rhythm associated with motion of the portable device (for example, the period and phase of any periodic motion of the portable device, e.g., periodic motion that may occur while a user wearing the device jogs or otherwise moves rhythmically) and to modify the playback of audio data in response to any such identified rhythm (e.g., to speed up or slow down playback of the audio data to match the rhythm of periodic motion of the device).

Figure 4:
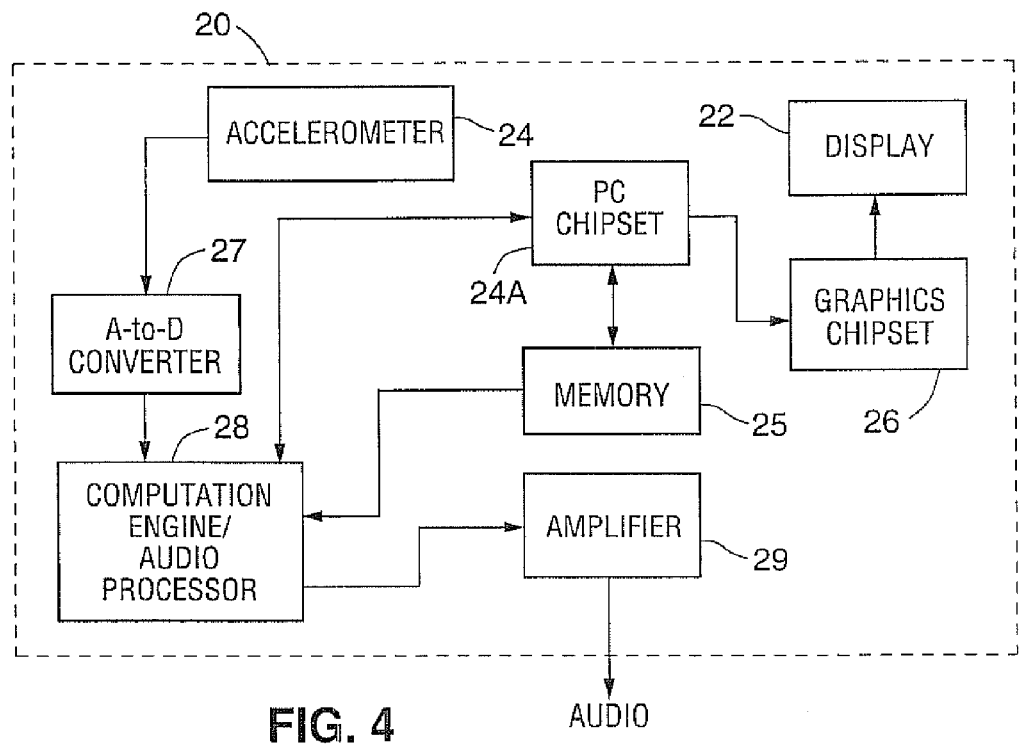
FIG. 4 is a block diagram of elements of an embodiment of the inventive digital media player.

FIG. 4 is a block diagram of digital media player 20 which includes conventional PC chipset 24 (which implements a CPU which runs player 20's operating system software), graphics chipset 26, display 22, memory 25 (which can be a flash memory), accelerometer 24, analog to digital conversion circuit 27, processor 28, and audio signal amplifier 29, connected as shown. Typically, media player 20 includes other elements but these are not shown for simplicity.

Analog-to-digital converter 27 captures the acceleration sensor data output (in analog form) from accelerometer 24 and converts this data into the digital domain for processing by processor 28. If accelerometer 24 is configured to output digital data indicative of sensed acceleration (rather than analog data), A-to-D converter 27 can be omitted and the output of accelerometer 24 provided directly to processor 28. Processor 28 saves the sensor data from converter 27 (or accelerometer 24, if converter 27 is omitted) into a file and processes the saved data as described below, or it processes the sensor data as described below without first saving the data.

Processor 28 (identified as a computation engine and audio processor in FIG. 4) is an auxiliary processor configured to perform at least one type of conventional digital audio data processing (e.g., decoding of MP3-encoded audio data that have been read from memory 25 to generate decoded audio data, and digital-to-analog conversion of the decoded audio data to produce an analog audio signal that can be amplified in amplifier 29 and output from player 20) while the CPU of player 20 (implemented in chipset 24) performs at least one other task. Processor 28 is shared in the sense that it is configured (e.g., programmed) to process acceleration data from converter 27 (or accelerometer 24, if converter 27 is omitted) in accordance with the invention, in addition to performing such conventional processing.

Elements 25, 28, and 29 of FIG. 4 comprise a digital audio processing subsystem of player 20. Processor 28 is configured to monitor acceleration data output from converter 27 to identify any rhythm associated with motion of player 20. An example of such rhythm is the period and phase of periodic motion of player 20 (e.g., periodic motion that may occur while a user wearing player 20 jogs or otherwise moves rhythmically). Processor 28 is also configured to modify the decoded audio data that it generates in response to any such identified rhythm, to perform digital-to-analog conversion on the resulting modified audio data, and to assert the resulting analog audio signal to amplifier 29. For example, one implementation of processor 28 is configured to vary the data rate at which the decoded audio data are asserted to digital-to-analog conversion circuitry (within processor 28), so that rhythm indicated by the resulting modified audio signal (that is output to amplifier 29) matches the rhythm of player 20's motion, thereby causing playback of the audio data to speed up or slow down to match the rhythm of player 20's motion. Such an implementation of processor 28 (or any of numerous variations thereon) can accommodate a listener's mood by sensing the listener's rhythm or "beat" (e.g., while the listener walks or exercises) and adjusts audio playback rates to match such rhythm.

In variations on the embodiment described with reference to FIG. 4, the elements of FIG. 4 are included within a notebook computer, tablet PC, PDA (personal digital assistant), smart cellular phone, or other portable device other than a digital media player.

It should be understood that while some embodiments of the present invention are illustrated and described herein, the invention is defined by the claims and is not to be limited to the specific embodiments described and shown.

What is claimed is:

1. A method of processing data, said method comprising:
 accessing first data associated with motion of a portable electronic device, wherein said first data is indicative of instantaneous acceleration of said portable electronic device;
 identifying a rhythm associated with said motion of said portable electronic device from said first data, wherein said rhythm comprises a period and a phase of said motion of said portable electronic device; and
 modifying audio data based on said rhythm.

2. The method of claim 1, wherein said modifying said audio data is operable to produce an alteration of a playback of said audio data.

3. The method of claim 2, wherein said alteration of said playback is selected from a group consisting of a speeding up of said playback and a slowing down of said playback.

4. The method of claim 1, wherein said first data is output from an accelerometer.

5. The method of claim 1 further comprising:
 accessing a signal output by an accelerometer;
 performing an analog-to-digital conversion on said signal to generate said first data.

6. The method of claim 1 further comprising:
 generating an analog audio signal based on said audio data; and
 amplifying said analog audio signal.

7. The method of claim 1, wherein said first data is associated with a freefall of said portable electronic device.

8. A digital audio processing subsystem comprising:
 a memory operable to store audio data; and
 a processor operable to access first data associated with motion of a portable electronic device, wherein said first data is indicative of instantaneous acceleration of said portable electronic device, wherein said processor is further operable to identify a rhythm associated with said motion of said portable electronic device from said first data, wherein said rhythm comprises a period and a phase of said motion of said portable electronic device, and wherein said processor is further operable to modify said audio data based on said rhythm.

9. The digital audio processing subsystem of claim 8, wherein said processor is further operable to modify said audio data to produce an alteration of a playback of said audio data.

10. The digital audio processing subsystem of claim 9, wherein said alteration of said playback is selected from a group consisting of a speeding up of said playback and a slowing down of said playback.

11. The digital audio processing subsystem of claim 8, wherein said first data is output from an accelerometer.

12. The digital audio processing subsystem of claim 8, wherein said first data is output from an analog-to-digital converter operable to generate said first data based on a signal output by an accelerometer.

13. A system comprising:
a component operable to generate first data associated with motion of a portable electronic device, wherein said first data is indicative of instantaneous acceleration of said portable electronic device; and
a digital audio processing subsystem coupled to said component, said digital audio processing subsystem comprising:
a memory operable to store audio data; and
a processor operable to access said first data, wherein said processor is further operable to identify a rhythm associated with said motion of said portable electronic device from said first data, wherein said rhythm comprises a period and a phase of said motion of said portable electronic device, and wherein said processor is further operable to modify said audio data based on said rhythm.

14. The system of claim 13, wherein said processor is further operable to modify said audio data to produce an alteration of a playback of said audio data.

15. The system of claim 14, wherein said alteration of said playback is selected from a group consisting of a speeding up of said playback and a slowing down of said playback.

16. The system of claim 14 wherein said alteration of a playback of said audio data is produced in order to match a mood of a listener.

17. The system of claim 13, wherein said component is an accelerometer.

18. The system of claim 13 further comprising:
an accelerometer, and
wherein said component is an analog-to-digital converter operable to generate said first data based on a signal output by said accelerometer.

19. The system of claim 13 further comprising:
an amplifier operable to amplify an analog audio signal output by said processor.

* * * * *